United States Patent [19]
Dian

[11] 3,719,104

[45] March 6, 1973

[54] BICYCLE BRAKE APPLYING DEVICE
[75] Inventor: Walter Dian, Downers Grove, Ill.
[73] Assignee: Excel, Inc., Franklin Park, Ill.
[22] Filed: Sept. 17, 1971
[21] Appl. No.: 181,378

[52] U.S. Cl. ................................................. 74/489
[51] Int. Cl. ............................................. G05g 11/00
[58] Field of Search ........................ 74/489, 488, 479

[56] References Cited

UNITED STATES PATENTS 2,237,581  4/1941  Schwinn ................................. 74/489
3,481,217  12/1969  Maeda .................................... 74/489

Primary Examiner—Leonard H. Gerin
Attorney—Carlton Hill et al.

[57] ABSTRACT

Bicycle brake actuator for drop type handle bars, such as are employed on lightweight touring types of bicycles. The brake actuator includes a main hand brake lever operable when the hands are on the hand grips of the handle bars, and an auxiliary brake lever movable relative to the main brake lever and operable by the hands when on the cross bar of the handle bar. In one form of the invention, either hand brake lever may be operated without affecting operation of the other lever. In another form of the invention, the main hand brake lever and auxiliary hand brake lever operate together when applying the brakes by the main hand brake lever and application of the brakes by the auxiliary hand brake lever has no affect on movement of the main hand brake lever.

10 Claims, 4 Drawing Figures

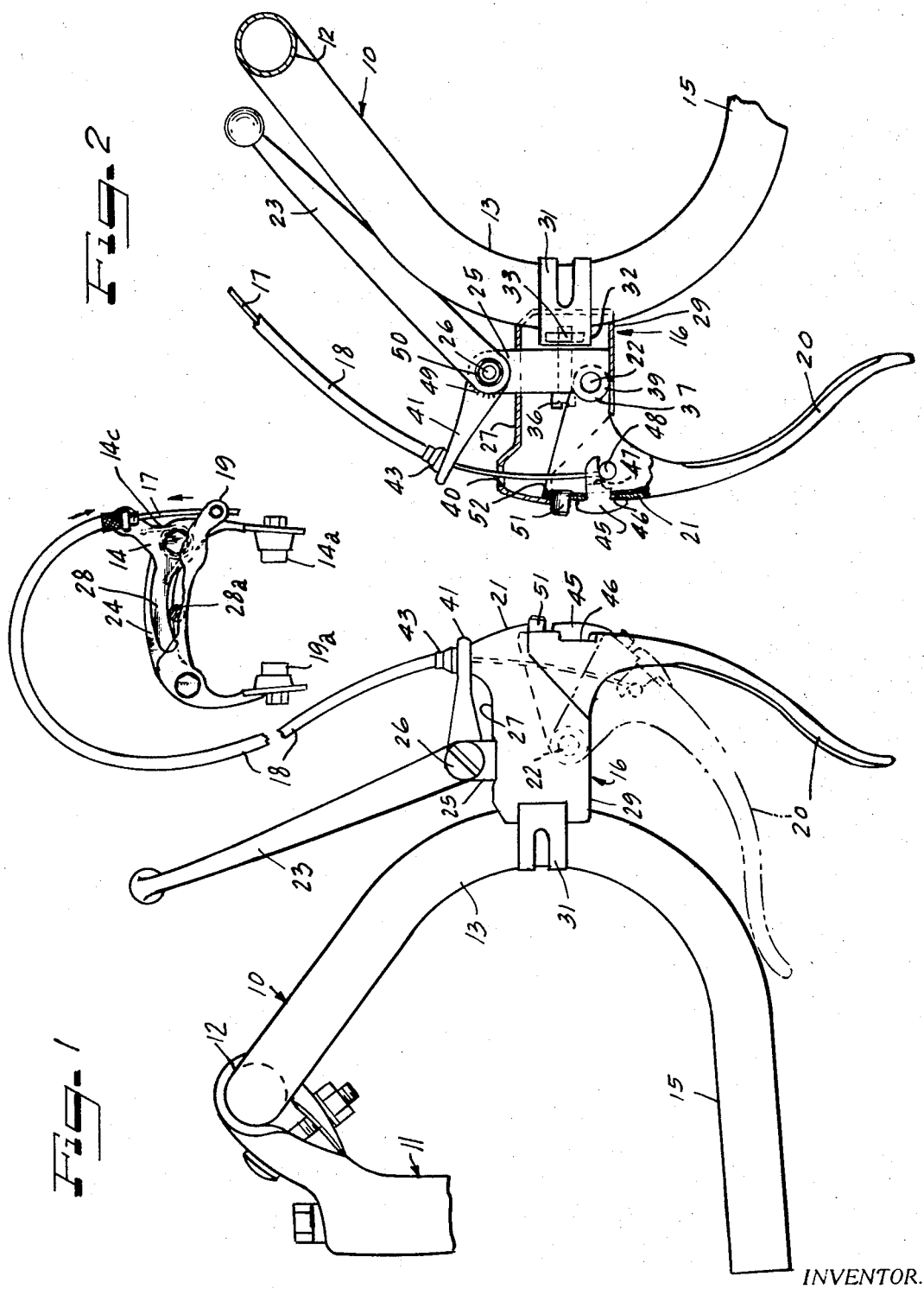

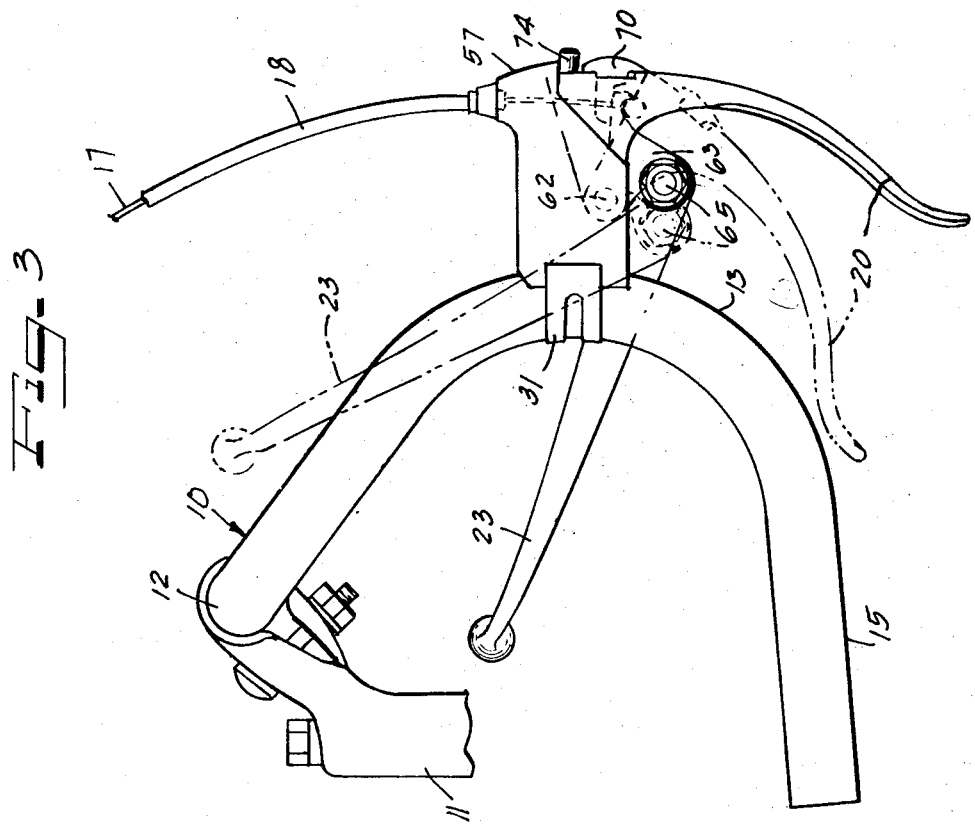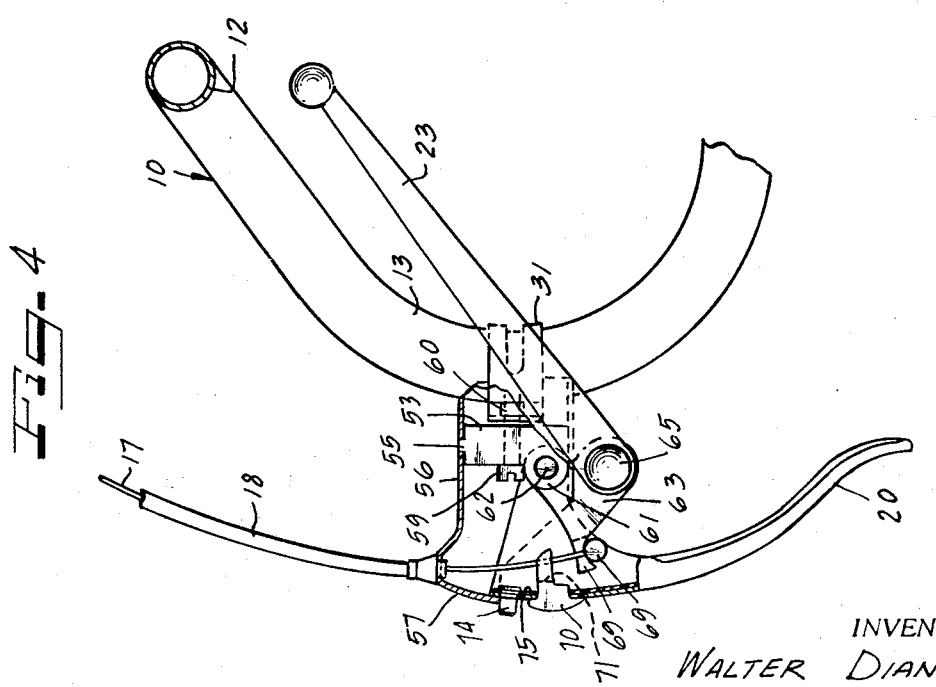

BICYCLE BRAKE APPLYING DEVICE

FIELD OF THE INVENTION

Bicycle brake applying device having main and auxiliary hand brake operating levers, accessible from the hand grips and cross bar of the handle bar of a bicycle.

BACKGROUND AND OBJECTS OF INVENTION

Bicycle brake operating devices having a main hand brake lever operable from the hand grips of the handle bar and an auxiliary hand brake lever operable from the cross bar of the handle bar are known. The bicycle brake actuator of the present invention is constructed along the general lines of the bicycle brake operating devices but improve on these bicycle brake levers in the simplicity of construction of the brake operating mechanism and the adaptability of the lever to hands of different sizes, and in that in one form of the invention the main and auxiliary brake levers are operated entirely independently of each other and are each in position to apply the brakes regardless of the position of the other lever and enable the brakes to be locked in wide open release positions, when it is desired to remove a wheel. The main brake lever further applies the brakes by exerting a pulling action on the flexible cable, and the auxiliary hand brake lever applies the brakes by a compressive force on the casing for the cable, flexing the casing to react against a normally taut flexible cable and move the cable along the casing to apply the brake shoes to the rim and tire of the bicycle. In a modified form of the invention, the levers are so arranged as to enable the brakes to be locked in wide open release positions, and operation of the auxiliary hand brake lever is entirely independent of the main hand brake lever. The positions of both brake levers may be varied for the convenience of the hands of different individuals and the main hand brake lever is in an accessible position to be grasped by the hand at all times during operation of the brakes.

An advantage of the bicycle brake operating device of the present invention is the simplicity in construction of the brake operating device and operative connection between the main and auxiliary brake levers and brakes of the bicycle, enabling a positive application of the brakes by either a main or auxiliary hand brake lever in a simplified manner.

Another advantage of the bicycle brake applying device of the present invention is the simplified construction of the actuator whereby the main and auxiliary hand brake levers are independently operable, and operation of one has no effect on operation of the other.

A further advantage of the invention is that a Bowden wire and flexible casing may each effect a brake applying operation, by operation of main and auxiliary hand brake levers.

A principal object of the present invention, therefore, is to provide a brake actuator for applying the brakes of a bicycle when the hands are either on the cross bar or hand grips of the handle bar, arranged with a view toward utmost simplicity and efficiency in construction and operation, and accessibility of the main and auxiliary hand brake levers to the handle bar of the bicycle for hands of different sizes.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a view in side elevation of a bicycle brake applying device constructed in accordance with the principles of the present invention, and clamped to the handle bar of a bicycle and diagrammatically showing the brakes connected to the brakes of a bicycle;

FIG. 2 is a view looking at the bicycle brake applying device toward the opposite side of the device from that shown in FIG. 1, with certain parts broken away and certain other parts shown in section;

FIG. 3 is a view in side elevation illustrating a modified form of the invention from that shown in FIGS. 1 and 2; and FIG. 4 is a view looking at the bicycle brake applying device toward the opposite side of the device from that shown in FIG. 3, with certain parts broken away and certain other parts shown in section.

DESCRIPTION OF PREFERRED EMBODIMENTS OF INVENTION

In the drawings, I have shown a drop type handle bar 10, clamped to a steering post 11, for turning the front wheel (not shown) of a bicycle in a conventional manner to steer the bicycle. The handle bar 10 has a cross bar 12 clamped to the steering post intermediate its ends and extending transversely of the line of travel of the bicycle, and generally horizontally. The cross bar 12 terminates into forwardly and downwardly curved portions 13, which turn rearwardly at their lower ends and terminate into generally horizontally and rearwardly extending hand grip portions 15 disposed beneath the cross bar.

A bicycle brake applying device 16 is clamped to each downturned end portion 13 of the handle bar. One brake applying device 16 on one side of the handle bar is provided to operate the front brakes (not shown) of the bicycle. The other brake applying device 16 on the opposite side of the handle bar is provided to operate the rear brakes of the bicycle. The brake applying devices on each side of the handle bar are of the same construction, so the brake applying device on one side of the handle bar only, need herein be shown and described.

The front and rear brakes may be conventional brakes commonly used to apply brake shoes to opposite sides of the rim and tire of the front and rear bicycle wheels, and are usually of a type termed "caliper brakes" operated by a flexible cable 17 surrounded by a flexible casing 18. The cable and casing assembly is commonly termed a "Bowden wire."

In the diagrammatic showing of the brake mechanism of FIG. 1, the casing 18 is secured at its free end to an actuating arm 14 for the brakes. The cable 17 is guided through the casing and stiffened thereby to pass over the actuating arm 14 and to be connected to a second actuating arm 19 for the brakes. The arms 14 and 19 are pivoted to opposite ends of a base 24, suitably mounted on the bicycle to position brake shoes 14a and 19a into position to engage the tire and rim of the bicycle wheel and brake the bicycle.

The arm 14 has a camming arm 28 engaged by a cam roller 28a on the arm 19 intermediate the pivots for said arms and camming the arm 14 to apply the brake shoe 14a upon application of a tension force on the cable 17. A torsion spring 14c encircles the pivot for the brake operating lever 14, and biases the arm 14 into engagement with the camming roller 28a and biases the brake shoes in their release positions.

The brake applying device 16, as shown in FIGS. 1 and 2, includes a main brake operating lever 20 pivoted within a housing 21 on a transverse pivot pin 22. Said brake operating device also includes an auxiliary brake operating lever 23 pivoted on a mounting bar 25 on a pivot pin 26. The mounting bar 25 forms a mounting for the pivot pins 22 and 26 and extends outwardly through a wall 27 of the housing 21, along the interior portion of said housing to the opposite wall thereof.

The wall 27 and an opposite wall portion 29 of the housing 21 have end portions formed to conform to the form of the handle bar, which are clamped thereto as by a clamping strap 31. As shown in FIG. 2, the clamping strap 31 extends partially about the handle bar and has parallel legs 32 secured to a nut in the form of a plate 33. The mounting bar 25 and housing 21 are moved towards the strap 31 as by a machine screw 36 extending through said clamping bar and threaded in said nut and drawing said clamping bar toward said nut and also drawing the housing 21 into clamping engagement with the handle bar.

The main brake operating lever 20 is of a generally U-shaped form and has parallel legs 37 extending along opposite sides of a boss 39 at the opposite end of the mounting bar from the pivot pin 26 and forming a mounting for the pivot pin 22. The housing 21 has an apertured leading end portion 40 abutted by a lever arm 41 mounted on the pivot pin 26, and connected with and operated by the auxiliary hand lever 23. The lever arm 41 has an opening extending therethrough for the flexible cable 17 and registering with the apertured portion 40 when the auxiliary lever is in its inoperative position. A connector 43 on the end of the casing 18 is provided to connect said casing to the end of the lever 41 in alignment with the opening extending therethrough. The connector 43 may be of a form well-known to those skilled in the art and commonly used to connect the casings of Bowden wires to stationary or movable members, so need not herein be shown or described further.

The brake operating lever 20 also has an abutment member 45 extending through a slot 46 of said housing into said housing and between the side walls thereof. The abutment 45 may be pressed to the slot 46, to be rigidly secured to the housing and has a downwardly opening slot 47 extending therealong, along which the flexible cable 17 extends.

A connector 48 is provided on the inner end of the flexible cable 17 and abuts the abutment member 45 and is effective to draw the flexible cable 17 along the casing 18 upon operation of the main hand brake lever 20. The end of the flexible cable 17 opposite from the connector 48 is secured to the actuating arm 14 of the caliper brake to operate said brake upon movement of the hand brake lever 20 toward the hand grip 15 of the handle bar.

The auxiliary hand brake lever 23 pivotally mounted on the pivot pin 26, has connection with the lever arm 41 through a serrated interengaging connection diagrammatically designated by radial lines 49 in FIG. 2. A nut 50 threaded on the pivot pin 26 clamps the lever 23 to the lever 41 and accommodates adjustment of the angular relation of the auxiliary lever 23 relative to the straight part of the handle bar to position said auxiliary hand brake lever where it may be conveniently gripped by large and small hands of different individuals riding the bicycle.

The casing 18 for the flexible cable 17 being connected to the lever 41 by the connector 43 is connected at its opposite end to the lever 14 of the caliper brake, as is conventional with such brakes. As the auxiliary hand brake lever 23 is grasped by the hand and moved in a brake operating direction, the casing 18 will be under compression and stiffened by the flexible cable 17 and will be moved along said flexible cable 17 and flex laterally due to the reaction of the casing against the lever arm 14 as compressively moved by the lever 41. This will draw the cable 17 along the casing 18 and effect pivotal movement of the lever arms 14 and 19 of the caliper brake, to apply the brake shoes to the rim of the bicycle wheel. Either the main hand brake lever 20 or the auxiliary hand brake lever 23 may be actuated by the hand to apply the brake shoes and operation of one lever has no affect on operation of the other lever.

The main hand brake lever 20 is shown as having a push button 51 thereon mounted on the end of a leaf spring 52 biasing the push button outwardly of said housing. The push button 51 serves as a stop to limit movement of the lever 20 and flexible cable 17 in a release direction. Said push button may be depressed against the bias of the spring 52 to come under the housing 21, to move and hold the brake shoes away from the tire and rim of the bicycle a distance sufficient to accommodate ready removal of the bicycle wheel.

In the embodiment of the invention illustrated in FIGS. 3 and 4, the main hand brake lever and auxiliary hand brake lever are the same as in the form of the invention illustrated in FIGS. 1 and 2. The Bowden wire or flexible cable 17 and casing 18 are also the same, as is the clamp clamping the device to the handle bar of a bicycle. The same reference numerals will, therefore, be applied to these parts as were applied in FIGS. 1 and 2.

In the modified form of the invention, a pivot support bar 53 for the levers 20 and 23 has a lug 55 extending within a rectangular open portion in a front wall 56 of a housing 57, and serving to clamp the housing to the downwardly curved portion 13 of the handle bar of the bicycle. The pivot support bar is clamped to the handle bar as by a machine screw 59 extending therethrough and threaded in a rectangular nut 60 extending across the legs of the clamp 31 and secured thereto.

The pivot support bar 53 has a boss 61 forming a mounting for a pivot pin 62 for the main hand brake lever 20, and a lever 63 forming a mounting for the auxiliary hand brake lever 23. The lever 63 extends outwardly of the housing 57. The auxiliary hand brake lever 23 is mounted on the outer end of the lever 63 on a bolt 65 which may be encircled by a spacer collar (not shown) spacing the auxiliary lever 23 to clear the handle bar and housing. Serrated connections may be provided between the collar and auxiliary lever 23 and between said collar and lever 63, to accommodate adjustment of said auxiliary lever to position the end thereof in accessible relation with respect to the cross bar of the handle bar to adapt the lever for convenient operation by riders of the bicycle, having large and small hands, and to clamp the auxiliary hand brake lever to the lever 63, by tightening of a nut 66 on the bolt 65, to provide a positive drive connection between said levers.

The lever 63 has an arm 67 extending therefrom within and between the legs of the open U-shaped portion of the lever 20 and forming an abutment for a connector 69 suitably secured to the end of the flexible cable 17, the opposite end of which is secured to a brake actuating lever 19.

The casing 18 is secured to the front or advance end of the housing 57, as by a conventional connector and is held from movement relative to said housing by said connector. The opposite end of the casing 18 is fixedly secured to an operating arm 14 of the caliper brake by a similar connector (not shown). Movement of the auxiliary hand brake lever 23 in a counterclockwise direction, as illustrated in FIGS. 3 and 4 will move the flexible cable 17 along the casing 18 to apply the brakes.

The main hand brake lever 20 has an abutment member 70, like the abutment member 45 pressed thereinto from the outside thereof having an inwardly opening slot 71 extending therealong and forming a guide for the flexible cable 17.

When the main and auxiliary hand brake levers 20 and 23 are in their release positions shown in FIG. 4, the inwardly projecting portion of the abutment 70 will abut the advance end of the abutment arm 67 of the lever 63. Thus, upon the exertion of pressure on the main hand brake lever 20 by the fingers of the hand, moving said lever toward the handle bar, the abutment 70 will engage and pivot the lever 63 and auxiliary hand brake lever 23, in brake applying directions, from the solid line position shown in FIG. 3 to the dotted line position shown in this figure, and exert a pulling action on the flexible cable 17, to apply the brake.

A stop button 74 on a leaf spring 75 is provided to limit movement of the main lever 20 and the auxiliary lever 23 in a release direction as in the form of the invention illustrated in FIGS. 1 and 2. This stop button may also be depressed to engage under the outer part of the housing 57 to quickly release and hold the brake shoes away from the rim and tire of the bicycle and thereby enable the bicycle wheel to be readily removed.

I claim as my invention:

1. In a device for applying the brakes of a bicycle to the rim of a bicycle wheel, and in combination with a bicycle handle bar having a straight cross bar, downwardly curved sections forming continuations of the ends of said cross bar and terminating into generally horizontally extending drop type hand grips,
   a brake lever housing,
   a clamp clamping said housing to the downwardly curved section of the handle bar and including a strap extending about the handle bar,
   a mounting bar within said housing and connected therewith, and means connected between said mounting bar and strap, clamping said strap to the handle bar,
   a main brake lever transversely pivoted to said mounting bar and positioned thereby in accessible relation relative to the hand grip of the handle bar,
   an auxiliary brake lever pivotally mounted on said mounting bar and positioned thereby in accessible relation relative to the cross bar of the handle bar,
   an abutment member mounted on said main brake lever and extending inwardly therefrom within said housing toward said mounting bar and having a downwardly opening slot therein,
   a flexible cable extending through said slot and having a connector on the free end thereof and adapted to be connected to a lever of the bicycle brake,
   a casing extending from said housing along said cable and adapted to be connected to a second lever of a bicycle brake,
   means operated by one hand brake lever for moving said cable relative to said housing through said abutment to apply the brake,
   and means operated by the other brake lever for applying the brakes independently of said first brake lever and said abutment.

2. The bicycle brake operating device of claim 1, wherein said main and auxiliary brake levers are transversely pivoted to said mounting bar in spaced relation with respect to each other,
   wherein one brake lever applies the brakes directly through said abutment and flexible cable, and
   wherein the other brake lever has engagement with the end of said casing, and exerts a compressive force thereon, flexing the casing to move laterally and exert a brake applying force on the cable upon movement of the auxiliary hand brake lever towards the handle bar.

3. The bicycle brake lever of claim 1,
   wherein one brake lever is transversely pivoted to said mounting bar and moves said cable in a brake applying direction by direct connection between said connector and said abutment,
   wherein the other brake lever is pivotally mounted on said mounting bar in parallel spaced relation with respect to the pivotal mounting of said first mentioned brake lever to said mounting bar and in advance of said housing, and includes an arm extending from said brake lever along said flexible cable and having abutting engagement with said casing for exerting a compressive force on said casing and effect movement of said cable in a brake applying direction independently of movement of said first brake lever.

4. The brake operating device of claim 1, including
   a pivot pin pivotally mounted on said mounting bar adjacent one end thereof and forming a mounting for one brake lever,
   a second pivot pin pivotally mounted on said mounting bar for movement about an axis parallel to the axis of pivotal movement of said first pivot pin and in advance of said housing,
   a lever arm extending from said second pivot pin and said auxiliary hand brake lever along the advance end of said housing and having an apertured portion extending along said flexible cable and forming an abutment for said casing in advance of said housing, whereby operation of said auxiliary hand brake lever and casing along said flexible cable effects the application of the brakes by the flexing of the cable and casing by the compressive action of said lever arm on the end of said casing.

5. The bicycle brake lever of claim 4,
wherein a clamping and interengaging connection is provided between said auxiliary brake lever and said main brake lever, accommodating the spacing of said auxiliary brake with respect to the cross bar of the handle bar to be varied, to enable said auxiliary brake lever to be operated by hands of different sizes.

6. The bicycle brake applying device of claim 1,
wherein the auxiliary hand brake lever is transversely pivoted to said mounting bar and has an arm extending from the pivot thereof towards said main brake lever and abutment,
wherein the end of said arm adjacent said abutment has a slot therein registering with said slot in said abutment, for the reception of the flexible cable,
wherein the connector on the end of the flexible cable has abutting engagement with said arm in registry with the slot therein, whereby pivotal movement of said auxiliary hand brake lever in a brake applying direction applies the brakes by movement of said auxiliary hand brake lever and the abutting engaging connection between said connector and lever arm, and
wherein said abutment on said main hand brake lever engaging said lever arm effects the application of the brakes by pivotal movement of said main hand brake lever and auxiliary hand brake lever by the abutting engaging connection between said main hand brake lever and said arm.

7. The bicycle brake lever of claim 5,
wherein the connection between said auxiliary brake lever and said arm is a clamping connection accommodating the spacing of said auxiliary lever with respect to said cross bar to be varied, to enable said auxiliary lever to be operated by hands of different sizes.

8. The bicycle brake lever of claim 1,
wherein the main hand brake lever is of a generally U-shaped form having legs slidably extending along the inside of said housing and including a pivot pin pivotally mounting said main hand brake lever on said mounting bar,
wherein a second lever extends within said housing between the legs of said first lever and is pivotally mounted on said mounting bar on said pivot pin,
said second lever forming a mounting for said auxiliary hand brake lever and pivotally moved thereby and having a lever arm engageable with said abutment when the brakes are released, having an outwardly opening slot therein through which the flexible cable extends, and abutted by said connector on the opposite side of said lever arm from said abutment, whereby pivotal movement of said auxiliary hand brake lever and lever arm effects application of the brakes by direct connection between said lever arm and connector and application of the brakes by said main hand brake lever is through the abutting connection between said abutment and said lever arm.

9. The bicycle brake operating device of claim 7,
wherein a clamping bolt is provided to connect said auxiliary hand brake lever to said lever arm, to accommodate the adjustment of said auxiliary hand brake lever relative to the cross bar of the handle bar.

10. The bicycle brake operating device of claim 7,
wherein a depressible button is mounted on said main hand brake lever between said legs and is spring biased to engage under said brake lever housing and accommodate quick release of the brakes to wide open positions.

* * * * *